March 6, 1945.   S. P. VAUGHN   2,370,698
DEVICE FOR TURNING OVER SMALL OBJECTS IN LARGE QUANTITIES
Filed Sept. 18, 1941
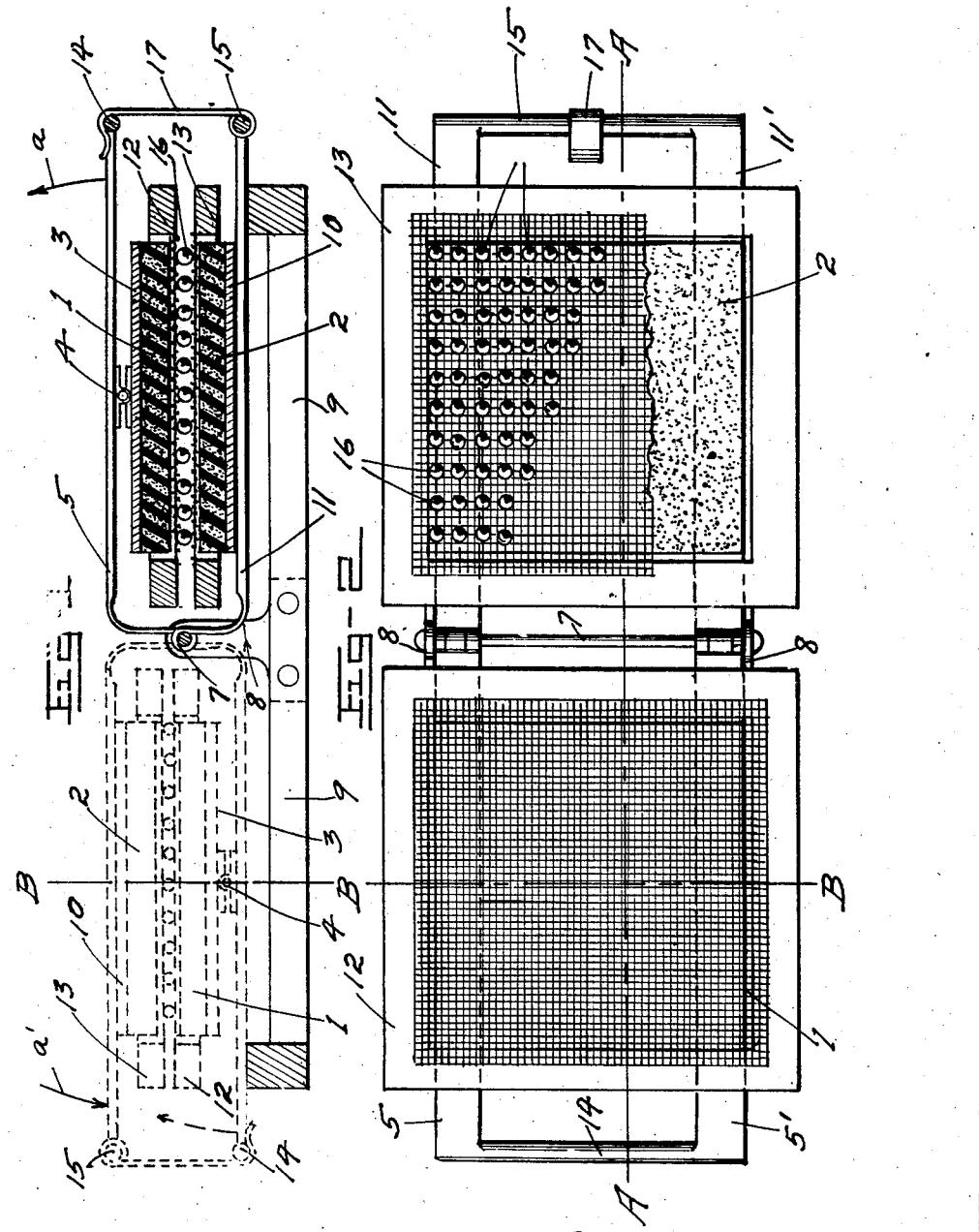
*Sidney P. Vaughn*
INVENTOR Patented Mar. 6, 1945

2,370,698

UNITED STATES PATENT OFFICE 2,370,698

DEVICE FOR TURNING OVER SMALL OBJECTS IN LARGE QUANTITIES

Sidney P. Vaughn, Ackerman, Miss.

Application September 18, 1941, Serial No. 411,384

6 Claims. (Cl. 214—1)

(Granted under the act of March 3, 1883, as amended April 30, 1928; 370 O. G. 757)

This invention relates to devices for quickly turning over small objects in large quantities, and particularly small objects which have been sprayed with paint or lacquer on one side so that the other sides of the objects may be sprayed.

Heretofore when small objects have been sprayed on one side with paint or lacquer in large quantities on a wire mesh screen it has been the usual practice to turn over such objects by hand in order to spray the other side. This method is a rather slow and tedious process.

It is the principal object of this invention to provide a novel and simple device which will transfer quickly small objects, such as beads and shells, which have been sprayed on one side on a screen, to another screen and at the same time turn over the objects so that the other side may be sprayed.

This and other objects readily apparent to those experienced in the trade are attained substantially by the device illustrated in the accompanying drawing, in which:

Fig. 1 is a cross section on line A—A Fig. 2, illustrating the device in two positions.

Fig. 2 is a plan view showing the device in an open position with wire mesh screens in position to affect a transfer of the objects.

Like numerals refer to like parts throughout the several views.

Briefly stated the device of the present invention for turning and transferring a mass of small objects comprises the combination of a pair of horizontally positioned vertically superimposed members adapted to support the objects therebetween and from one to the other of which such objects are to be transferred, means for clamping the members against opposite sides of the objects, and supporting means for the members for effecting their joint rotation and inversion, whereby upon subsequent separation of the members, the objects will be inverted from their first position and transferred to the other on said members. The present device as above noted is particularly designed for the support of relatively small beads and shells and the like for spraying. These objects will vary somewhat in size and form, even though preliminarily graded. Accordingly the support of a very large number of such objects between the members for inversion without permitting a slipping or rocking or turning of the objects relative to the members, is one of the main objectives to be accomplished by the present device. This is here effected by providing on at least one of the aforementioned members a yieldable compressible surface for engagement with the objects so that upon clamping of the members together a contacting support will be provided with the smaller of such objects.

Referring to Fig. 1, numerals 1 and 2 designate opposed sponge rubber pads spaced the required distance to yieldingly clamp small objects therebetween. The sponge rubber pad 1 is secured to a backing plate 3 which is pivoted on a transverse center line B—B by a hinge 4 to the under side of the upper straps 5 and 5' of a pair of offset strap hinges arranged to articulate on a hinge pin 7 secured by its ends to a pair of hinge posts 8 extending upwardly from the center portion of a frame member 9 which supports the movable parts of the device.

The sponge rubber pad 2 is secured to a backing plate 10 attached on the top or inside of the lower straps 11 and 11' of the pair of offset strap hinges, opposite to the sponge rubber pad 1, but in spaced relation thereto. The upper and lower hinge straps are offset to allow sufficient space between the two sponge rubber pads, when they are parallel with each other, to accommodate two yieldable wire mesh screens 12 and 13 and the objects 16, (in the drawing the small objects are indicated as small beads or balls) which are to be transferred from one screen to the other and at the same time turned over.

The upper sponge rubber backing 3 is pivoted by the hinge 4 to the hinge straps 5 and 5' in such a manner as to permit rocking of the plate through a small arc so that it will readily adjust itself and attain a plane parallel with the lower sponge rubber pad 2 when the two pads are brought together to grip between the two screens the objects to be transferred and turned over, thus applying equal pressure on all of the objects.

The hinge straps 5 and 5' and 11 and 11' extend across the sponge rubber backings 3 and 10 a substantial distance beyond the outer edge of the backings. The outer ends of the upper hinge straps 5 and 5' are connected by a handle bar 14 and the outer ends of the lower hinge straps 11 and 11' are connected by a handle bar 15. A spring clip 17 is attached to the lower handle bar 15 and formed to snap over the upper handle bar 14 to hold the two rubber pads slightly compressed in operative position as will be more fully described hereinafter.

The strap hinges are arranged to articulate around the hinge pin 7, which is common to both hinges, so that the rubber pads may be opened apart to receive the wire mesh screens 12 and 13 as indicated in Fig. 2, or closed to yieldingly clamp the wire mesh against the objects to be transferred and turned as indicated in Fig. 1.

In operation, the sponge rubber pads are first opened apart as indicated in Fig. 2. The wire mesh screen 13 containing the objects to be turned and transferred is placed on the right hand rubber pad 2, and an empty wire mesh screen 12 is placed on the left hand sponge rubber pad 1 in the manner indicated in the drawing. The sponge rubber pad 1 with its empty wire mesh screen 12 is swung over and around the hinge pin 7 to rest on top of the objects 16 on the wire mesh screen 13 as illustrated in Fig. 1. The two rubber pads are pulled together tightly to grip the objects 16 between the wire mesh of the two screens and the spring clip 17 is snapped over the handle bar 14 to hold the unit together. As will be understood the wire mesh screens 12 and 13 possess a sufficient flexibility or yieldability to move under the distributed yieldable pressure applied by the pads into contact with the upper and lower sides of substantially each of the multi-sized objects to firmly grip said objects between the screens. The entire operating unit is then swung over to the left side of the frame 9 as indicated by the arrows (a) and (a') and the dotted outline of the device. When in the position indicated by the dotted lines the spring clip 17 is released and the rubber pad 2 is returned to its original position on the right side of the frame 9. The wire mesh screen 13 is removed from the objects 16 leaving them transferred to the wire mesh screen 12 and turned over ready for spraying. The screen 12 may then be taken to the spray booth for spraying the other side of the objects.

While I have illustrated a sponge rubber pad to yieldingly compress the objects to be sprayed until they have been turned over and transferred to another screen, it will be understood that I may use any other soft type of pad such as a felt pad. Also, while I have described the device as being useful in painting small objects in large quantities, it will be understood that it may be used for any other purpose where it is desired to transfer objects from one screen or plate to another in large quantities without disturbing the objects with the hands and wherein the objects are of a substantially strong, hard and rigid character capable of withstanding the requisite compression pressure between the screens without breaking or deforming.

From the above description it will be apparent that I have provided a very simple and efficient device for transferring small objects in large quantities from one plate or screen to another and at the same time turn the objects over for any desired purpose.

The device may be modified in various respects as will occur to those skilled in the art and the exclusive use of all such modifications as come within the scope of the appended claims is contemplated.

The invention described herein may be manufactured and used by the Government of the United States of America for governmental purposes without the payment of any royalties thereon or therefor.

What I claim is:

1. In a turning and transfer device of the character described, the combination of yieldable screen members adapted to engage the opposite sides of objects to be turned, compressible pads mounted at the outer sides of said screen members, and means for applying a clamping force to said pads to urge said screen members against said objects.

2. A turning and transfer device comprising, a support, a compressible pad mounted on said support in horizontal position, a detachable and yieldable screen member mounted on said pad for supporting a plurality of objects to be turned, a second detachable and yieldable screen member superimposed on said objects, a second compressible pad mounted on said second screen member, and a clamp device surrounding said pads and operable to apply a clamping pressure thereto and being pivoted to said support for rotation with said pads and screen members and objects as a unit through 180° to an inverted position on said support.

3. In a turning device of the character described, a pair of juxtapositioned yieldable pads adapted to support therebetween a plurality of objects to be turned, means hingedly mounting said pads for joint rotation about an axis adjacent one edge thereof, and means for pressing said pads toward each other to grip said objects therebetween and rockably mounting one of said pads whereby adjustment is permitted relative to the other pad.

4. In a turning device of the character described, a pair of juxtapositioned yieldable pads adapted to support therebetween a plurality of objects to be turned, means hingedly mounting said pads for joint rotation about an axis adjacent one edge thereof, and a yieldable foraminated sheet extending over each of said pads on the inner face thereof, and means for pressing said pads toward each other to grip said objects between said sheets and rockably mounting one of said pads whereby adjustment is permitted relative to the other pad.

5. In a turning and transfer device of the character described, the combination of yieldable screen members adapted to engage the opposite sides of objects to be turned, pads mounted at the outer sides of said screen members, one of said pads being compressible, and means for applying a clamping force to said pads to urge said screen members against said objects.

6. In a turning device of the character described, a pair of juxtapositioned yieldable pads hingedly mounted for joint rotation about an axis adjacent one edge thereof, a yieldable foraminated sheet extending over each of said pads on the inner face thereof and adapted to support therebetween a plurality of objects to be turned, means for pressing said pads toward each other to cause said foraminated sheet to grip objects therebetween, and adjusting means whereby a uniform pressure is applied to all parts of the foraminated sheet and the objects supported therebetween.

SIDNEY P. VAUGHN.